(12) United States Patent
Wicks (10) Patent No.: US 11,479,494 B2
(45) Date of Patent: Oct. 25, 2022

(54) POROUS GLASS MICROSPHERES, COMPOSITE MATERIALS AND METHODS OF USING SAME

(71) Applicant: George G. Wicks, Aiken, SC (US)

(72) Inventor: George G. Wicks, Aiken, SC (US)

(73) Assignees: George G. Wicks, Aiken, SC (US); Applied Research Center, Inc., Aiken, SC (US)

( * ) Notice: Subject to any disclaimer, the term of this patent is extended or adjusted under 35 U.S.C. 154(b) by 0 days.

(21) Appl. No.: 17/076,413

(22) Filed: Oct. 21, 2020

(65) Prior Publication Data

US 2021/0300810 A1   Sep. 30, 2021

Related U.S. Application Data

(60) Provisional application No. 63/001,669, filed on Mar. 30, 2020.

(51) Int. Cl.
| | | |
|---|---|---|
| *C03B 19/10* | (2006.01) | |
| *C03C 11/00* | (2006.01) | |
| *C03C 12/00* | (2006.01) | |

(52) U.S. Cl.
CPC ............ *C03B 19/108* (2013.01); *C03B 19/10* (2013.01); *C03C 11/002* (2013.01); *C03C 12/00* (2013.01); *Y10T 428/2995* (2015.01)

(58) Field of Classification Search
CPC ....................................... C03B 19/00–19/1492
See application file for complete search history.

(56) References Cited

U.S. PATENT DOCUMENTS

| | | | |
|---|---|---|---|
| 3,630,700 A * | 12/1971 | Hammel | ............. C03B 19/1065 65/21.4 |
| 7,666,807 B2 | 2/2010 | Heung et al. | |
| 8,535,725 B2 | 9/2013 | Li et al. | |
| 8,758,715 B2 | 6/2014 | Wicks et al. | |
| 2006/0060820 A1 | 3/2006 | Schumacher | |
| 2010/0139320 A1 | 6/2010 | Schumacher | |
| 2010/0247663 A1 | 9/2010 | Day et al. | |
| 2011/0027188 A1 | 2/2011 | Kleiner et al. | |
| 2016/0207817 A1 | 7/2016 | Hojaji et al. | |
| 2017/0275196 A1* | 9/2017 | Ahmed | ............... C03B 19/1075 |

(Continued)

FOREIGN PATENT DOCUMENTS

| | | |
|---|---|---|
| DE | 4443172 A1 | 6/1996 |
| WO | 2008069777 A1 | 6/2008 |

OTHER PUBLICATIONS

R. Mohtadt, K. Tange, T. Matsunaga, G. Wicks, K. Heung and R. Schumacher, "A New Way for Storing Reactive Complex Hydrides on Board of Automobiles", Ceramic Transactions, vol. 202, pp. 91-96, 2009.

(Continued)

*Primary Examiner* — Alexandre F Ferre
(74) *Attorney, Agent, or Firm* — Todd A. Serbin; Nexsen Pruet, LLC (57) ABSTRACT

A glass microsphere, comprising: a main body, wherein the main body is solid while including a network of interconnected pores produced from a phase separation process and thermal and chemical leaching operations, with porosity extending throughout a cross-section of the solid glass microsphere.

8 Claims, 6 Drawing Sheets

(56) References Cited

U.S. PATENT DOCUMENTS

2017/0354755 A1* 12/2017 Weinberger ............ A61L 27/26
2019/0117828 A1    4/2019 Weinberger et al.

OTHER PUBLICATIONS

Cunningham, H. Faircloth, M. Jones, T. Lewis, G. Wicks, G. Postma, P. Cunningham, H. Faircloth, M. Jones, T. Lewis, G. Wicks, G. Postma, P. Weinberger, "A Reporter Assay for the Next Generation of Biomaterials; Porous-Wall Hollow Glass Microspheres", The Laryngoscope 124 [6], pp. 1302-1397, 2014.
G. G. Wicks, W.D. Hill, P.M. Weinberger, "Tiny Bubbles; Composite Cocktails for Medical Applications", International Journal of Applied Glass Science, ISSN 2041-1286, vol. 7, No. 2, pp. 164-172, Jun. 2016.
G. Wicks, G. Crawford, J. Keller, F. Humes, F. Thompson, "Glass Microspheres Hollow Out a Niche for Anti-counterfeiting Strategies", Ceramic Bulletin, American Ceramic Society, vol. 95, No. 6, pp. 24-29, Aug. 2016.
G.G. Wicks, invited communications to special addition in the International Issue ". . . article entitled Nanostructures and 'Nanonothingness' in Unique Glass Microspheres", 1 JAGS, vol. 4, Issue 2, pp. 100-104, Jun. 2013.
G.G. Wicks, S. Serkiz, S. Li and W. Dyan, invited chapter to 2nd Edition textbook. Intoduction to Bioceramics, edited by L.L. Hench entitled "Porous Wall, Hollow Glass Microspheres", Chapter 35, pp. 505-509, Imperial College Press, 2013.
R. Mohtadi, T. Matsunaga, K. Heung and R. Schumacher and G. Wicks, "Hollow Glass Microspheres as Micro Media for Complex Metal Hydrides Hydrogen Storage Compounds", published in Journal of the SC Academy of Sciences Special Edition 2011.
S. Li, L. Nguyen, H. Xiong, M. Wang, T. Hu, J-X She (MCG), S. Serkiz, G. Wicks (SRNL) and W. Dynan (MCG), "Porous-Wall Hollow Glass Microspheres as Novel Potential Nanocarriers for Biomedical Applications", in Nanomedicine: Nanotechnology, Biology and Medicine, 6, pp. 127-136, 2010.
S. Li, L. Nguyen, H. Xiong, M. Wang, T. Hu, J-X She (MCG), S. Serkiz, G. Wicks (SRNL) and W. Dynan (MCG), "Nanocarriers for Biomedical Applications", published in Journal of the SC Academy of Sciences Special Edition, 9, pp. 30-32, 2011.
K. Heung, G. Wicks, and R. Schumacher, "Encapsulation of Palladium in Porous Wall Hollow Gas Microspheres", Ceramic Transactions, vol. 202, pp. 143-148, 2009.
G. Wicks, K. Heung, R. Schumacher, "Microspheres and Microworlds . . . SRNL's Porous, Hollow Glass Balls Open New Opportunities for Hydrogen Storage, Drug Delivery and National Defense", Ceramic Bulletin, American Ceramic Society, vol. 87, No. 6, pp. 23-28, Jun. 2008.
W. Hankle, "Beautiful Balloons . . . Microspheres Starting to Lift Hopes for Transportation and Medicine", Ceramic Bulletin, American Ceramic Society, vol. 87, No. 6, pp. 31-33, Jun. 2008.

* cited by examiner

POROUS GLASS MICROSPHERES, COMPOSITE MATERIALS AND METHODS OF USING SAME

RELATED APPLICATION

This application claims the benefit of priority under 35 U.S.C. § 119(e) of U.S. Provisional Patent Application No. 63/001,669 filed Mar. 30, 2020, the contents of which are incorporated herein by reference in their entirety.

FIELD OF THE INVENTION

The present invention, in some embodiments thereof, relates to materials science, chemistry, physics and biology, and more particularly, but not exclusively, to porous solid glass microspheres and composite materials utilizing the same.

BACKGROUND OF THE INVENTION

A variety of porous glasses have been developed over the years using a variety of techniques, and for many different types of uses. Porous-wall, hollow glass microspheres were developed in the early 2000's at the Savannah River National Laboratory in Aiken, S.C. These materials contained a unique through wall nano-porosity used to fill the inside voids of the hollow microspheres with cargos of interest. This technology was subsequently patented by the current inventor and his team in U.S. Pat. Nos. 7,666,807, 8,535,725, and 8,758,715, the disclosures of which are incorporated herein in their entireties.

As a supplement to the porous-wall, hollow glass microspheres described above, the inventor also recently received a patent, U.S. Pat. No. 10,201,633, the disclosure of which is incorporated herein in its entirety, for uses of the porous-wall, hollow glass microsphere technology and its composites for specific fields of use.

Additional background art in this area, the entireties of which are incorporated herein by reference, includes U.S. Pub. No. 2006/0060820, U.S. Pub. No. 2010/0139320, and WO 2008/069777 and:

G. G. Wicks, W. D. Hill, P. M. Weinberger, "Tiny Bubbles; Composite Cocktails for Medical Applications", International Journal of Applied Glass Science, ISSN 2041-1286, Vol. 7, No. 2, pp. 164-172, June 2016.

G. Wicks, G. Crawford, J. Keller, F. Humes, F. Thompson, "Glass Microspheres Hollow Out a Niche for Anti-counterfeiting Strategies", Ceramic Bulletin, American Ceramic Society, Vol. 95, No. 6, pp. 24-29, August 2016.

Cunningham, H. Faircloth, M. Jones, T. Lewis, G. Wicks, G. Postma, P. Cunningham, H. Faircloth, M. Jones, T. Lewis, G. Wicks, G. Postma, P. Weinberger, "A Reporter Assay for the Next Generation of Biomaterials; Porous-Wall Hollow Glass Microspheres", The Laryngoscope 124 [6], pp. 1302-1397, 2014.

G. G. Wicks, invited communications to special addition in the International Issue " . . . article entitled "Nanostructures and 'Nano-nothingness' in Unique Glass Microspheres", 1JAGS, Vol. 4, Issue 2, pp. 100-104, June 2013.

G. G. Wicks, S. Serkiz, S. Li and W. Dyan, invited chapter to $2^{nd}$ Edition textbook. *Introduction to Bioceramics*, edited by L. L. Hench entitled "Porous Wall, Hollow Glass Microspheres", Chapter 35, pp. 505-509, Imperial College Press, 2013.

R. Mohtadi, T. Matsunaga, K. Heung and R. Schumacher and G. Wicks, "Hollow Glass Microspheres as Micro Media for Complex Metal Hydrides Hydrogen Storage Compounds", published in Journal of the SC Academy of Sciences Special Edition 2011.

S. Li, L. Nguyen, H. Xiong, M. Wang, T. Hu, J-X She (MCG), S. Serkiz, G. Wicks (SRNL) and W. Dynan (MCG), "Porous-Wall Hollow Glass Microspheres as Novel Potential Nanocarriers for Biomedical Applications", in Nanomedicine: Nanotechnology, Biology and Medicine, 6, pp. 127-136, 2010.

S. Li, L. Nguyen, H. Xiong, M. Wang, T. Hu, J-X She (MCG), S. Serkiz, G. Wicks (SRNL) and W. Dynan (MCG), "Nanocarriers for Biomedical Applications", published in Journal of the SC Academy of Sciences Special Edition, 9, pp. 30-32, 2011.

K. Heung, G. Wicks, and R. Schumacher, "Encapsulation of Palladium in Porous Wall Hollow Gas Microspheres", *Ceramic Transactions*, Vol. 202, pp. 143-148, 2009.

T. Hu (MCG), N. Tanasak (MCG), and G. (SRNL), "Using Glass Microspheres and Other Nano-Materials as Potential Delivery Vehicles for Monitoring Inflammatory Activation Following Traumatic Brain Injury", MCG/SRNL White paper for Wounded Warriors Care Project, 2009.

R. Mohtadt, K. Tange, T. Matsunaga, G. Wicks, K. Heung and R. Schumacher, "A New Way for Storing Reactive Complex Hydrides on Board of Automobiles", *Ceramic Transactions*, Vol. 202, pp. 91-96, 2009.

G. Wicks, K. Heung, R. Schumacher, "MICROSPHERES and MICROWORLDS . . . SRNL's Porous, Hollow Glass Balls Open New Opportunities for Hydrogen Storage, Drug Delivery and National Defense", Ceramic Bulletin, American Ceramic Society, Vol. 87, No. 6, pp. 23-28, June 2008.

W. Hankie, "BEAUTIFUL BALLOONS . . . Microspheres Starting to Lift Hopes for Transportation and Medicine", Ceramic Bulletin, American Ceramic Society, Vol. 87, No. 6, pp. 31-33, June 2008.

SUMMARY OF THE INVENTION

According to an aspect of some embodiments of the present invention there is provided a solid glass microsphere, comprising a main body, wherein the solid main body includes a network of inter-connected pores, produced by a phase separation process via thermal and chemical leaching operations, extending throughout the cross-section of the solid glass microsphere.

In an embodiment of the invention, the network of pores traverse through the main body from one side to an opposite side.

In an embodiment of the invention, the glass microsphere can further contain at least one or more cargos of interest within the network of pores.

In an embodiment of the invention, the main body has a diameter of 1-1,000 microns.

In an embodiment of the invention, the nano-porosity created inside and throughout the solid glass microsphere ranges is within the size range of 100 to 5,000 Angstroms, and was produced by a unique glass-glass phase separation process, followed by thermal and chemical treatments to produce the special nano-porosity.

In an embodiment of the invention, the glass microsphere can further comprise at least one or more surface coatings.

According to a further aspect of some embodiments of the present invention there is provided a method of manufacturing a glass microsphere, comprising: melting a glass borosilicate frit (containing no blowing agents) to make solid glass beads including a glass matrix (a major difference from producing porous wall hollow glass microspheres that must use blowing agents to produce their internal voids); thermally treating the glass beads, separating the alkali-borate and silica phases in the glass matrix; leaching out preferentially the alkali-borate phase, forming a main body, wherein the main body is solid while including a network of inter-connected pores produced by the phase separation processes of the thermal and chemical leaching operations, the network of inter-connected pores extending throughout a cross-section of the solid glass microsphere; and, loading the microspheres with cargos of interest, retaining the cargos, coating the loaded beads if desired, and finally, releasing cargos of interest on demand.

According to a further aspect of some embodiments of the present invention there is provided a composition of matter, comprising: a plurality of microspheres, including at least one glass microsphere comprising a main body, wherein the main body is solid while including a network of inter-connected pores extending throughout the cross-section of the solid glass microsphere. This porous, solid glass microsphere can also contain different and various cargos, including solids, liquids and/or gases, as well as being part of various mixes of other solid, hollow, porous wall, and porous glass microspheres.

In an embodiment of the invention, the composition of matter further comprises a matrix medium.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings and/or images. With specific reference now to the drawings in detail, it is stressed that the particulars shown are by way of example, are not necessarily to scale and are for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to materials science, chemistry, physics and biology, and more particularly, but not exclusively, to porous solid glass microspheres and composite materials utilizing the same.

Figure 1:
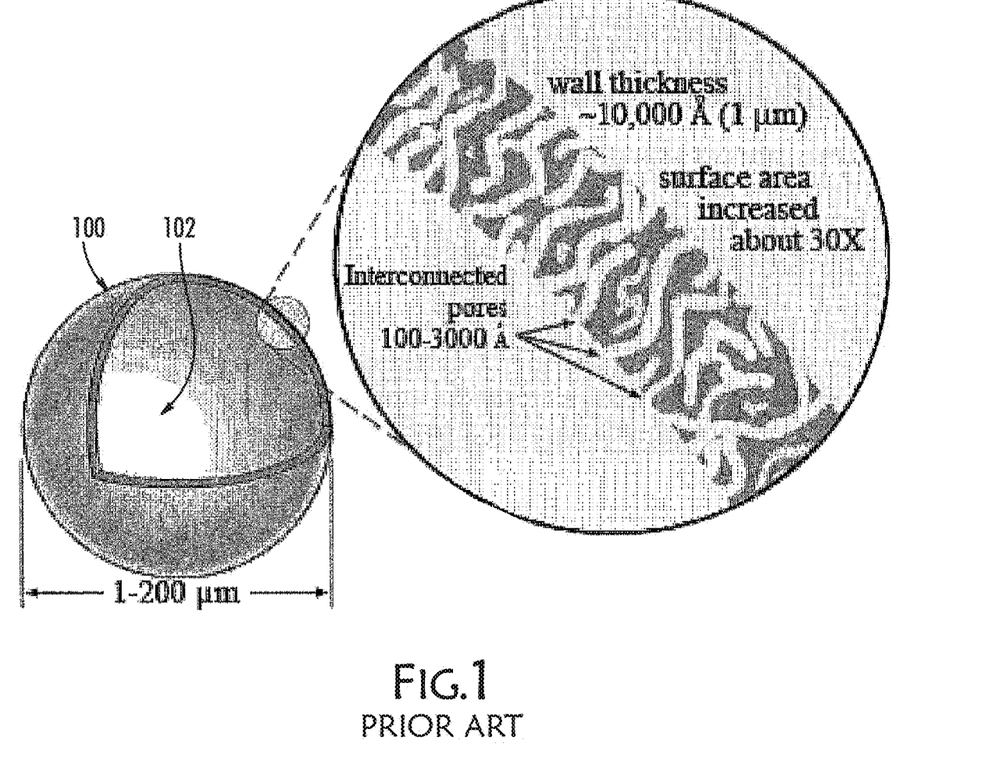
FIG. 1 is a schematic representation of a prior art porous-wall hollow glass microsphere, containing a central void.
Figure 2:
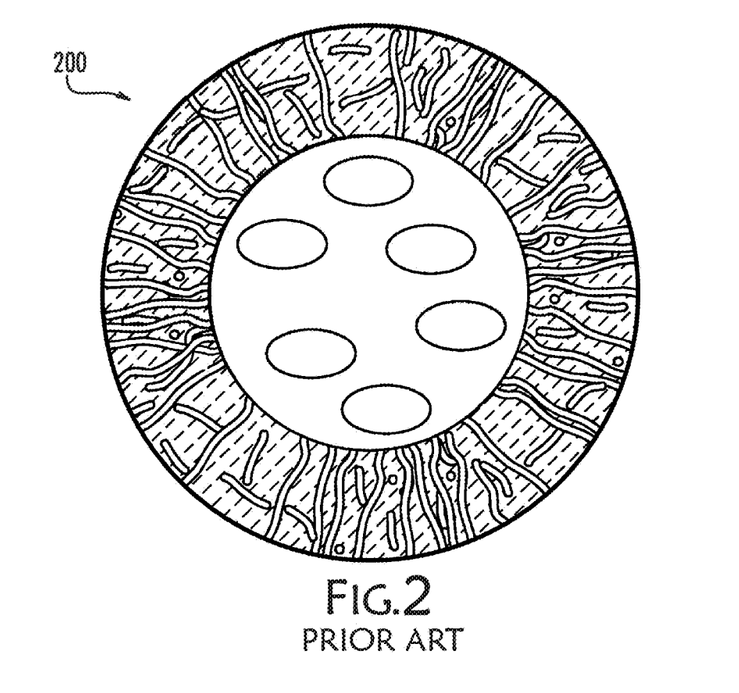
FIG. 2 is a schematic cross-sectional view of a prior art porous-wall hollow glass microsphere.

For purposes of better understanding some embodiments of the present invention, as illustrated in FIGS. 3-8 of the drawings/images, reference is first made to the construction and operation of a porous-wall, hollow glass microsphere 100 as illustrated in FIG. 1, which is FIG. 1 from U.S. Pat. No. 8,535,725. As can be seen from this FIG. 1, features of this type of microsphere are a hollow interior or central void, and a thin wall around the hollow interior, which has a certain interconnected porosity to enable loading and/or release of cargo into/from the interior. FIG. 2 is from U.S. Pat. No. 7,666,807 (which is FIG. 1 in that patent), which shows a cross-sectional view of a porous-wall, hollow glass microsphere 200, including a cargo area 102 located therein.

Before explaining at least one embodiment of the invention in detail, it is to be understood that the invention is not necessarily limited in its application to the details of construction and the arrangement of the components and/or methods set forth in the following description and/or illustrated in the drawings, images and/or the Examples. The invention is capable of other embodiments or of being practiced or carried out in various ways.

Figure 3:
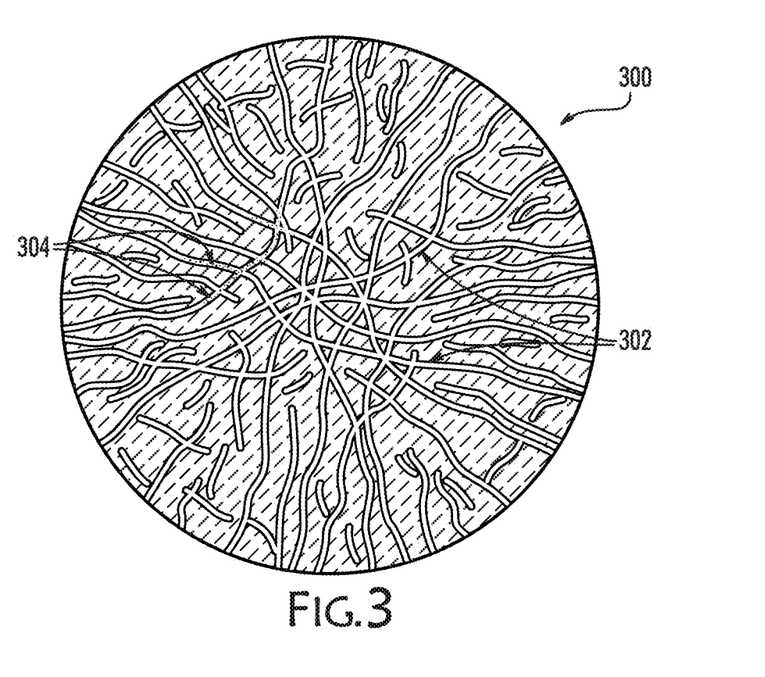
FIG. 3 is a schematic cross-sectional view of a phase separated, porous, solid glass microsphere, in accordance with an exemplary embodiment of the invention.

Referring now to the drawings, FIG. 3 is a schematic cross-sectional view of a phase separated, porous, solid glass microsphere 300, in accordance with an exemplary embodiment of the invention. Porous, solid glass microspheres, such as shown in FIG. 3, provide characteristics and/or features above and beyond what the previously described porous-wall, hollow glass microspheres 100, 200 can provide. For example, their solid nature exhibits extremely strong mechanical characteristics with respect to the porous-wall, hollow glass microspheres 100, 200, which comprise a large internal void surrounded by a very thin porous glass shell. In addition, the interconnected pores 302 of the porous, solid glass microsphere 300 (i.e. the porosity extends from the exterior of the microsphere all the way into the interior, throughout the cross-section of the sphere, and back out to the exterior) provides a unique morphology which aids in impregnating or filling the microsphere 300 with cargos 304 of interest, which can be delivered on demand and/or in a calculated and/or specific manner. Also, these cargos within the solid microspheres are extremely strong and can now be ink jet printed or used in very severe applications and environments.

Figure 7:
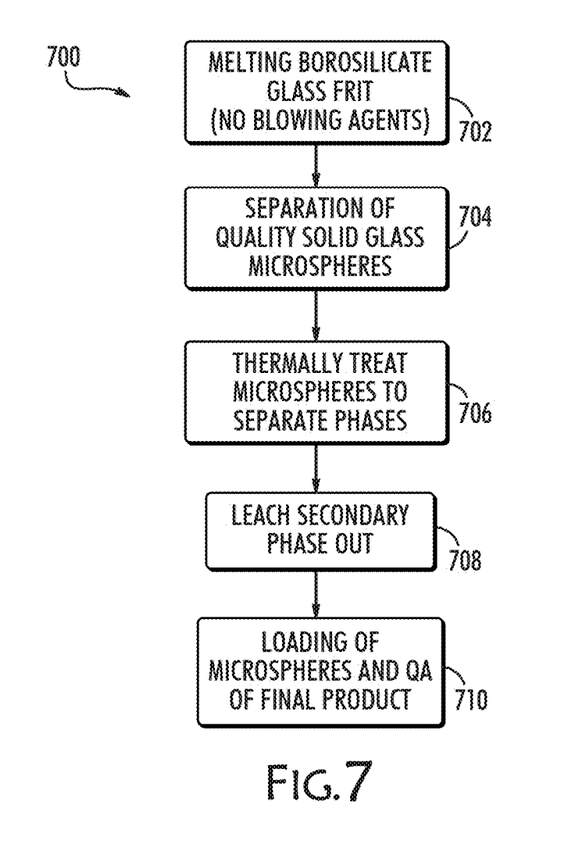
FIG. 7 is a flowchart showing a method for making phase separated, porous, solid glass microspheres, in accordance with an exemplary embodiment of the invention.

FIG. 7 is a flowchart 700 showing a method for making and using porous, solid glass microspheres 300, in accordance with an exemplary embodiment of the invention. In some embodiments of the invention, manufacturing commences (702) with the melting of a borosilicate glass frit, the composition of which has the ability to phase separate, but having no blowing agents (e.g. sulfates) in the formulation. This produces solid glass beads/spheres constructed from the alkali borosilicate glass composition. The resultant solid glass beads/spheres are separated (704) depending on certain desired qualities, for example size and/or desired size distribution of the whole. The solid glass beads are subsequently thermally treated (706), for example heated, in order to facilitate phase separation, producing an interconnected alkali-borate rich phase and a silica rich phase. The secondary (alkali-borate) phase can be then removed selectively by chemical leaching (708), leaving behind a unique, continuous nano-porosity, in an enriched highly durable silica matrix. The leaching out of the alkali-borate phase yields both surface as well as a network of interconnected internal porosity on a slightly larger scale than other phase separated microspheres, in some embodiments, between 100-5,000 Angstroms. In some embodiments of the invention, the porous solid glass microspheres are then processed (710) for loading with cargo of interest, for example by cleaning them, subjecting them to additional sizing selection and/or manufacturing, then impregnating them with the cargo(s) desired and assessing these products for quality assurance purposes.

Figure 4:
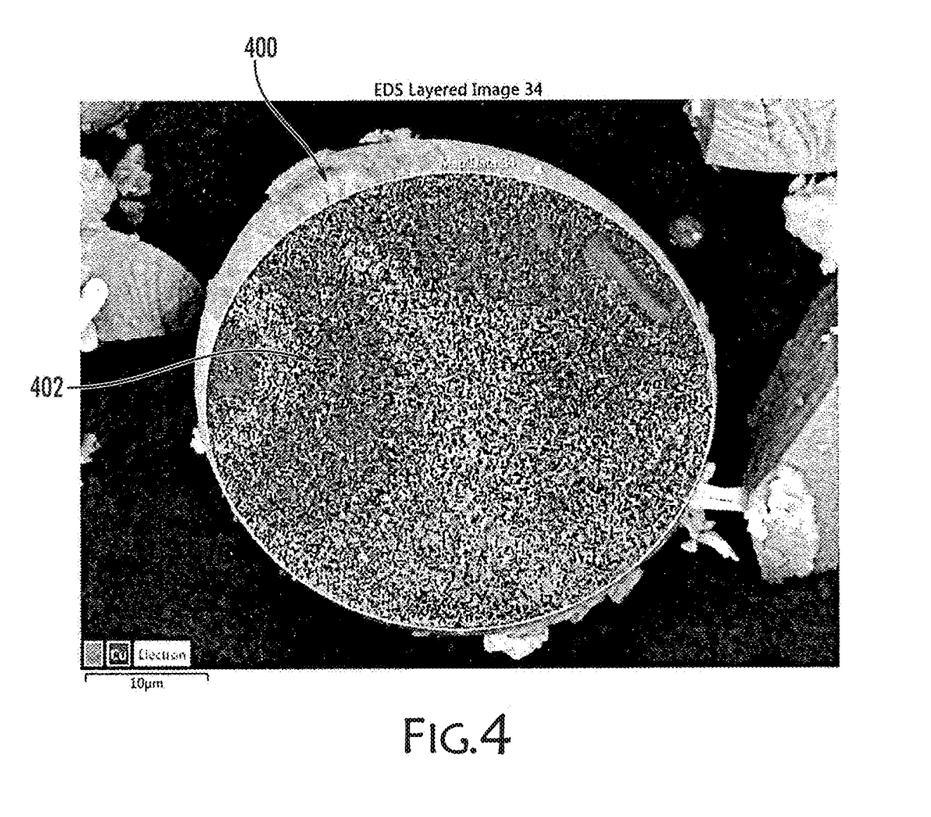
FIG. 4 is a microphotograph of a cross-sectioned, phase separated, porous, solid glass microsphere, in accordance with an exemplary embodiment of the invention and containing no central void.

FIG. 4 is a microphotograph of a cross-sectioned, porous, solid glass microsphere 400, in accordance with an exemplary embodiment of the invention. FIG. 4 shows an actual, real-world example of a microsphere 400 which has been impregnated with a copper formulation to enhance the visibility of the pore network 402 within the microsphere 400 and to demonstrate the concept. Similar micrographs were observed after filling with nickel compounds as well.

Figure 5:
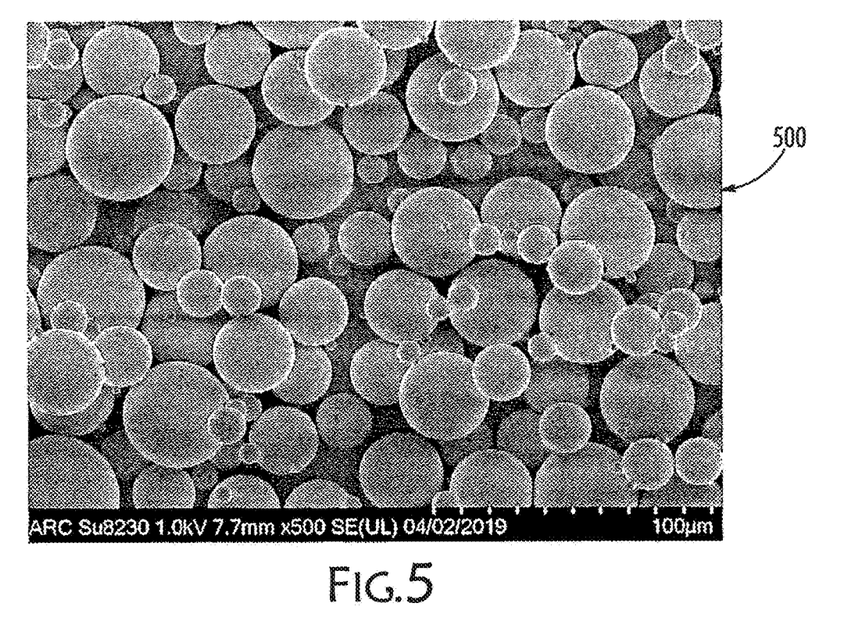
FIG. 5 is microphotograph showing a mass of phase separated, porous, solid glass microspheres of different sizes, in accordance with an exemplary embodiment of the invention.

FIG. 5 is microphotograph showing a mass 500 of glass microspheres of different sizes, in accordance with an exemplary embodiment of the invention. It should be understood that due to limitations of manufacturing such small structures, microspheres are not made exactly the same size, but within a range of varying sizes. However, by subsequent sizing operations, more uniform distributions of sizes can be achieved of sizes most desired, depending on their applications.

Figure 6:
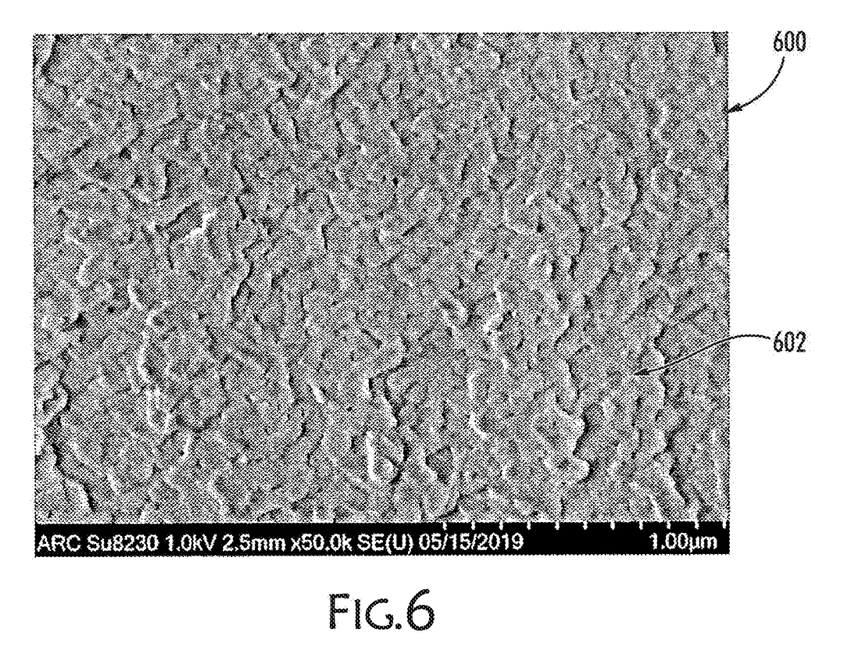
FIG. 6 is a microphotograph showing a close-up view of a cross-sectioned phase separated, porous, solid glass microsphere and its interconnected nano-porosity throughout, in accordance with an exemplary embodiment of the invention.

FIG. 6 is a microphotograph showing a close-up view of a cross-sectioned phase separated, porous, solid glass microsphere 600, in accordance with an exemplary embodiment of the invention, wherein the interconnected pore network 602 can be clearly seen, throughout the cross-section of the solid glass microsphere.

Exemplary Microsphere Cargo

The porous, solid glass microspheres (sometimes referred to herein as pSGMs) can be loaded with solids, liquids and/or gases, as well as inorganic and/or organic materials, and produce a system of significant strength. Because of the high strength of these porous microspheres, they also have the advantage of being able to use more aggressive loading techniques compared to porous wall, hollow, glass microspheres (sometimes referred to herein as PWHGMs).

Examples of cargos which can be used with pSGMs include cargos in energy applications, waste management and environmental remediation, security, consumer goods and medical uses. In the medical field specific cargos can include gene therapy agents, growth factors, anti-fungal agents, anti-bacterial agents, anesthetics, antihistamines, anti-inflammatory agents, dyes/pigments/coloring agents, cells, bacteria, viruses, hydrogen, biomolecules and any cargoes described in U.S. Pat. Nos. 7,666,807, 8,535,725, 8,758,715, and 10,201,633, the disclosures of which are included herein by reference.

Microsphere Coatings

In some embodiments of the invention, the glass microspheres can be coated for a variety of uses. The coating can be a ceramic, polymer, metal, and for medical applications, can also include a drug, protein, peptide, polymer, saccharide or a combination thereof. The coating can act to delay or prolong delivery of the contents of a porous, solid glass microsphere loaded with cargo. In some embodiments, the coating contains, or is subsequently attached to, a targeting moiety to target the glass microspheres in medical applications to a specific tissue, organ or cell type. The coating can also be used to further improve the mechanical integrity, chemical durability and functionality of the microspheres. Coatings such as described in U.S. Pat. Nos. 7,666,807, 8,535,725, 8,758,715, and 10,201,633 could also be used.

Targeting Moieties

The glass microspheres can be targeted to a specific tissue or organ for medical applications. The targeting moiety can be coated onto the glass microspheres or can be attached to a polymer that coats the glass microspheres. The targeting moiety of the glass microsphere can be an antibody or antigen-binding fragment thereof. The targeting moiety can be an RNA or protein shaped to specifically interact with the target (e.g., an RNA- or peptide-aptamer). The targeting moiety can be a small molecule or element with specific binding affinity (e.g., biotin which binds streptavidin, or iron which is bound by the transferrin receptor). The targeting moieties should have an affinity for a cell-surface receptor, cell-surface antigen, or other ligand that is specific to the target tissue.

The targeting moiety can specifically recognize and bind to a target molecule specific for a cell type, a tissue type, or an organ. The target molecule can be a cell surface polypeptide, lipid, or glycolipid. The target molecule can be a receptor that is selectively expressed on a specific cell surface, a tissue or an organ. Cell specific markers can be for specific types of cells including, but not limited to stem cells, skin cells, blood cells, immune cells, muscle cells, nerve cells, cancer cells, virally infected cells, and organ specific cells. The cell markers can be specific for endothelial, ectodermal, or mesenchymal cells. Representative cell specific markers include, but are not limited to cancer specific markers.

The glass microspheres can also contain a detectable label, such as, a radioisotope, a fluorophore (e.g., fluorescein isothiocyanate (FITC), phycoerythrin (PE)), an enzyme (e.g., alkaline phosphatase, horseradish peroxidase), element particles (e.g., gold particles) or a contrast agent. These may be encapsulated within, dispersed within, or conjugated to the polymer.

For example, a fluorescent label can be chemically conjugated to a polymer of the glass microsphere to yield a fluorescently labeled polymer. In other embodiments the label is a contrast agent. A contrast agent refers to a substance used to enhance the contrast of structures or fluids within the body in medical imaging. Contrast agents are known in the art and include, but are not limited to agents that work based on X-ray attenuation and magnetic resonance signal enhancement. Suitable contrast agents include iodine, barium and other materials.

Figure 8A:
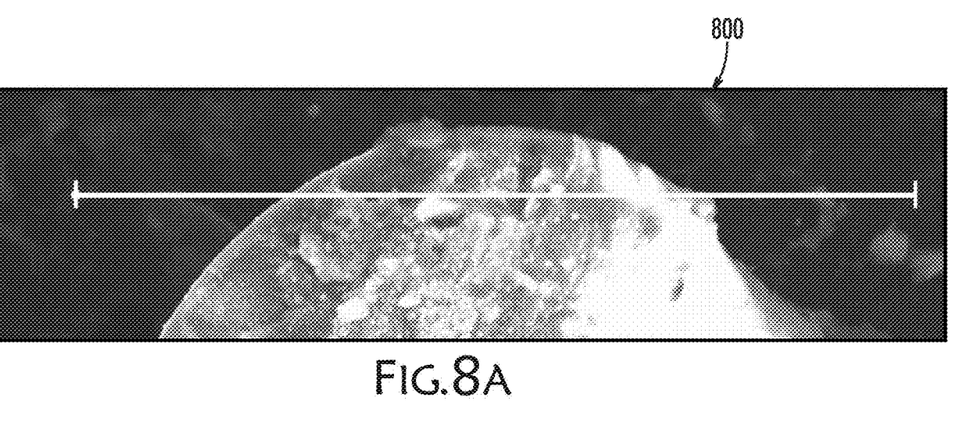
FIG. 8A is microphotograph showing a phase separated, porous, solid glass microsphere loaded with a nickel compound as cargo, in accordance with an exemplary embodiment of the invention; and, FIG. 8B is a graph showing elemental line profiles shown for each of the elements found across the cross-section of the microsphere of FIG. 8A.
Figure 8B:
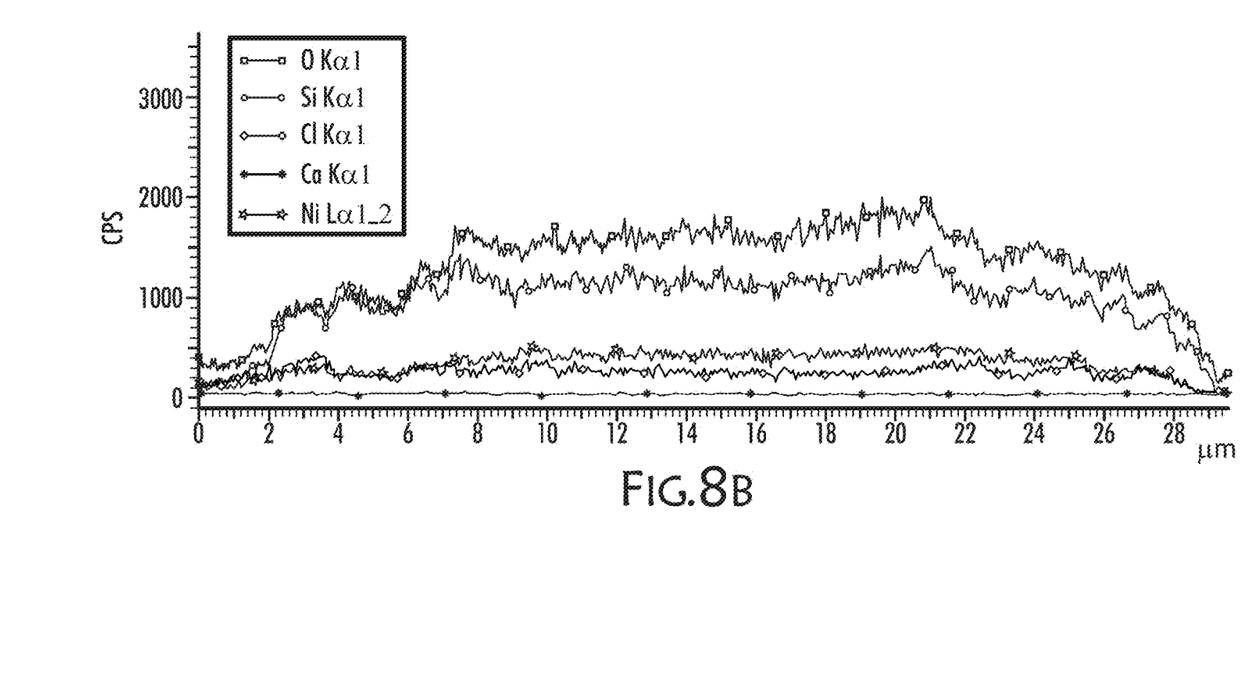

FIG. 8A is microphotograph showing a phase separated, porous, solid glass microsphere 800 loaded with a nickel compound as cargo, in accordance with an exemplary embodiment of the invention. It can be seen from this micrograph that consistent and effective loading a cargo of interest into the nano-pore network of a porous, solid glass microsphere is achievable using the porous, solid glass microspheres and methods described herein. FIG. 8A shows a cross-sectional view of a pSGM after filling with a Ni-compound and after being broken in half. The line transversing the cross section is an elemental scan which was conduced for elements found in cargos and glass microspheres, and included Ni, Cl, Si, O, Ca and C. The elemental line profiles shown for each of these elements is given in FIG. 8B. Note that the Ni—Cl compound is shown present across the entire cross section of the pSGM and also shows a relatively continuous distribution of the elements, across the entire cross section of the glass filled glass microsphere. It should also be noted that 8 line profiles were taken at eight different cross section locations and for each line scan, and that 10 passes were collected on each line. Also, 500 data points were collected per line. Therefore, these micrographs represent and summarize 40,000 data points. It should also be noted that similar results have been obtained for other cargos, including cupper chloride, as well.

In addition to what is described above, it should be understood that composite materials can be formed from a plurality of glass microspheres including phase separated, porous, solid glass microspheres, in accordance with an exemplary embodiment of the invention. The disclosed composite material(s) contain: solid glass microspheres; porous-wall, hollow glass microspheres; hollow glass microspheres; porous, solid glass microspheres; or combinations thereof, together with a biocompatible or bioactive or biodegradable matrices for in-vivo uses in a variety of medical applications. In some embodiments this matrix is a fluid (sol). In other embodiments this matrix is a gel, and in still other embodiments this matrix is convertible between sol and gel phases.

One embodiment provides glass microspheres having a diameter of less than 1 mm and greater than 1 μm. In some embodiments, the glass microspheres have a diameter ranging from about 2 μm to about 500 μm or 2 to 300 μm or 10 to 100 μm. Exemplary diameters are 10 to 50 μm, or 10 to 60 μm, and more specific diameters are 5 to 20 μm, 20 to 40 μm, 20 to 60 μm, or 40 to 60 μm. The diameter of the glass microspheres are typically of a dimension that allows the composite to be easily applied and used for the applications desired. For medical uses, this includes sizes that can be introduced or implanted into a patient and be compatible with the in-vivo environment. In one embodiment the composite is implanted by injection. In some embodiments, the injection is performed through a needle with a diameter ranging from about 30 to about 18 gauge. In a more specific embodiment the injection is performed through a 21, 23, or 25-gauge needle. In other embodiments the pSGMs with drug cargos can also be introduced in vivo by oral or inhalation pathways.

The glass microspheres can be all the same diameter or can have multiple diameters in the described ranges. In certain embodiments, the microspheres are all one type, and in other embodiments, multiple types of microspheres are combined.

In certain embodiments, the glass microspheres are coated, such as described elsewhere herein. The glass microspheres can be coated with a chemical, element, drug, biological molecule, polymer or a combination thereof. The coating can contain or be attached to, a moiety allowing targeting of the glass microspheres to a specific organ, tissue or cell type.

Hollow glass microspheres, and porous wall hollow microspheres (hereafter referred to collectively as "hollow microspheres") and porous, solid microspheres can be loaded with cargo including but not limited to biological molecules, chemicals, elements, or other materials. In one embodiment the cargo can also be a pigment or coloring agent. The hollow microspheres and porous, solid microspheres can be loaded with one or more therapeutic agents such as antibiotics, anti-inflammatory agents, growth factors, cytokines, chemokines, chemotherapeutic agents, cytotoxic agents, antibodies, or combinations thereof. The hollow microspheres and porous, solid microspheres can be loaded with cargo of living biological elements such as cells, bacteria, viruses, or combinations thereof. The cargos above can exist alone or in various combinations. The loaded glass microspheres can be modified to delay or extend the release of cargo from the glass microspheres once the glass microspheres have been administered to a subject.

The glass microsphere composites are useful as bulking agents for tissue augmentation and as a means for delivering therapeutic substances. The biocompatible matrix and various types and ratios of microspheres to matrix can be formulated using conventional techniques. Density, sizes and size distributions of microspheres, viscosities of solutions, can be modulated for desired uses.

Exemplary Suspension Matrices for the Composite Materials

The glass microspheres are optionally combined with one or more matrices, like gelling agents and hydrogels, to produce new groups of composites. These composites have properties that can be enhanced compared to the individual components alone, as exemplified by many unique systems and composites currently in the commercial sector. There are many gelling agents. Some of the common ones are acacia, alginic acid, bentonite, Carbopols® (now known as carbomers), carboxymethylcellulose. ethylcellulose, gelatin, hydroxyethylcellulose, hydroxypropyl cellulose, magnesium aluminum silicate (Veegum®), methylcellulose, poloxamers (Pluronics®), polyvinyl alcohol, sodium alginate, tragacanth, and xanthan gum. Though each gelling agent has some unique properties, there are some generalizations that can be made.

Some gelling agents are more soluble in cold water than in hot water. Methylcellulose and poloxamers have better solubility in cold water while bentonite, gelatin, and sodium carboxymethylcellulose are more soluble in hot water. Carbomers, tragacanth, and alginic acid gels are made with tepid water.

Some gelling agents (carbomers) require a "neutralizer" or a pH adjusting chemical to create the gel after the gelling agent has been wetted in the dispersing medium.

Exemplary methods and/or materials for suspension matrices are described in more detail in U.S. Pat. No. 10,201,633

Exemplary Formulations of Composite Materials Including Microspheres

The glass microsphere composites can be formulated to contain an effective amount of glass microspheres in a biocompatible matrix appropriate for administration to an individual in need thereof as a bulking agent, cosmetic agent, colorant, or to treat a pathology, disease or syndrome.

The composite can be formulated for parenteral delivery, such as injection or infusion by altering the composite formulation. The viscosity of this system can then be tailored to the applications desired. The formulation can be administered directly by injection.

Parenteral formulations can be prepared as aqueous compositions using techniques known in the art. Typically, such compositions can be prepared as injectable formulations, for example, solutions or suspensions; solid forms suitable for using to prepare solutions or suspensions upon the addition of a reconstitution medium prior to injection; emulsions, such as water-in-oil (w/o) emulsions, oil-in-water (o/w) emulsions, and microemulsions thereof, liposomes, or emulsomes.

The matrix can be a solvent or dispersion medium containing, for example, water, ethanol, one or more polyols (e.g., glycerol, propylene glycol, and liquid polyethylene glycol), oils, such as vegetable oils (e.g., peanut oil, corn oil, sesame oil, etc.), and combinations thereof. The proper fluidity can be maintained, for example, by the use of a coating, such as lecithin, by the maintenance of the required particle size in the case of dispersion and/or by the use of surfactants. In many cases, it will be preferable to include isotonic agents, for example, sugars or sodium chloride.

Solutions and dispersions of the nanoparticles can be prepared in water or another solvent or dispersing medium suitably mixed with one or more pharmaceutically acceptable excipients including, but not limited to, surfactants, dispersants, emulsifiers, pH modifying agents, and combination thereof.

Suitable surfactants may be anionic, cationic, amphoteric or nonionic surface active agents. Suitable anionic surfactants include, but are not limited to, those containing carboxylate, sulfonate and sulfate ions. Examples of anionic surfactants include sodium, potassium, ammonium of long chain alkyl sulfonates and alkyl aryl sulfonates such as sodium dodecylbenzene sulfonate; dialkyl sodium sulfosuccinates, such as sodium dodecylbenzene sulfonate; dialkyl sodium sulfosuccinates, such as sodium bis-(2-ethylthioxyl)-sulfosuccinate; and alkyl sulfates such as sodium lauryl sulfate. Cationic surfactants include, but are not limited to, quaternary ammonium compounds such as benzalkonium chloride, benzethonium chloride, cetrimonium bromide, stearyl dimethylbenzyl ammonium chloride, polyoxyethylene and coconut amine. Examples of nonionic surfactants include ethylene glycol monostearate, propylene glycol myristate, glyceryl monostearate, glyceryl stearate, polyglyceryl-4-oleate, sorbitan acylate, sucrose acylate, PEG-150 laurate, PEG-400 monolaurate, polyoxyethylene monolaurate, polysorbates, polyoxyethylene octylphenylether, PEG-1000 cetyl ether, polyoxyethylene tridecyl ether, polypropylene glycol butyl ether, Poloxamer® 401, stearoyl monoisopropanolamide, and polyoxyethylene hydrogenated tallow amide. Examples of amphoteric surfactants include sodium N-dodecyl-β-alanine, sodium N-lauryl-β-iminodipropionate, myristoamphoacetate, lauryl betaine and lauryl sulfobetaine.

The formulation can contain a preservative to prevent the growth of microorganisms. Suitable preservatives include, but are not limited to, parabens, chlorobutanol, phenol, sorbic acid, and thimerosal. The formulation may also contain an antioxidant to prevent degradation of the active agent(s) or nanoparticles.

The formulation is typically buffered to a pH of 3-8 for parenteral administration upon reconstitution. Suitable buffers include, but are not limited to, phosphate buffers, acetate buffers, and citrate buffers.

Water soluble polymers are often used in formulations for parenteral administration. Suitable water-soluble polymers include, but are not limited to, polyvinylpyrrolidone, dextran, carboxymethylcellulose, and polyethylene glycol.

A sterile injectable material can be prepared by incorporating the glass microsphere and matrix composite in the required amount in the appropriate solvent or dispersion medium with one or more of the excipients listed above, as required. The injectable material can be sterilized either before or after compounding. Generally, dispersions are prepared by incorporating the desired sterilized glass microspheres into a sterile matrix which can also contain the dispersion medium and required other ingredients from those listed above. In the case of sterile powders for the preparation of sterile injectable solutions, exemplary methods of preparation are vacuum-drying and freeze-drying techniques which yield a powder of the glass microsphere and matrix composite plus any additional desired ingredient from a previously sterile-filtered solution thereof.

The composite may also contain one or more tonicity agents to adjust the isotonic range of the formulation. Suitable tonicity agents are well known in the art. Examples include glycerin, mannitol, sorbitol, sodium chloride, and other electrolytes.

The composite may also contain one or more preservatives to prevent bacterial contamination of the preparations. Suitable preservatives are known in the art, and include polyhexamethylenebiguanidine (PHMB), benzalkonium chloride (BAK), stabilized oxychloro complexes (otherwise known as Purite®), phenylmercuric acetate, chlorobutanol, sorbic acid, chlorhexidine, benzyl alcohol, parabens, thimerosal, and mixtures thereof.

The composite may also contain one or more excipients known art, such as dispersing agents, wetting agents, and suspending agents.

An exemplary embodiment provides the composite of glass microspheres in a gel matrix as described above. For example, in one embodiment the composite consists of combining glass microspheres with the gel matrix "PLO gel", made by combining a Pluronic® F-127 gel and a lecithin/isopropyl palmitate syrup. The two components are made and stored separately. When it is time to compound a formulation, water soluble drugs are dissolved in the Pluronic® gel or oil soluble drugs are dissolved in the lecithin syrup. If a small quantity of formulation is to be made, each of the components can be put into a syringe and the two syringes are connected by an adapter. The mixture is forced between the two syringes and the shear caused by the passing the mixture through the adapter will create the final composite material. In one embodiment, the force required to eject the composite is less than 10 N, preferably between 2 and 8 N inclusive.

Exemplary Methods for Use of pSGM Composites

Porous, solid glass microspheres loaded with cargos of interest and with and without being part a diverse array of composites, can be used for a variety of applications. These uses can be in the fields of Energy, Waste Management and Environmental Remediation, Security, Consumer Goods and a Variety of Medical Uses. In any of these areas, any application requiring delivery of cargos of interest and on demand, can profit from the use of these materials and their composites.

For example, in the use of anti-counterfeiting, the ability to produce markings via holograms, can provide a 'fingerprint' defining the part history and its origin. This could be produced using 'functional cargos' as now being investigated and introduced by techniques such as ink jet printing and manufacturing techniques such as 3-D fabrication. For medical applications, a variety of drugs can be uses and delivered to locations of importance and released either quickly or via sustained release over long periods of time.

Exemplary Methods and Apparatuses for Medical Delivery

The porous, solid glass microspheres can be loaded with a variety of therapeutic agents described above. The loaded glass microspheres can be administered to soft or hard tissue and thereby augment the tissue while also delivering the therapeutic agents to the tissue. The glass microsphere compositions can contain different glass microspheres loaded with different therapeutic agents. Thus a single glass microsphere composition can deliver multiple therapeutic agents. As noted above, the glass microspheres can be gated or coated to have delayed or immediate release of their cargos.

One embodiment provides a kit containing the glass microspheres, therapeutic agents for loading the glass microspheres, a biocompatible matrix such as a gelling agent, polymer, or liquid for forming a composite material containing the glass microspheres and matrix. The kit contains printed directions of use. The components can be housed in a single container. Preferably the components of the kit are sterilized. In one embodiment, the kit contains a preloaded syringe containing the glass microsphere composite.

Syringes useful for administering the glass microsphere composites include any syringe known in the art capable of delivering viscous dermal filler compositions. The syringes generally have an internal volume of about 0.4 mL to about 3 mL, more preferably between about 0.5 mL and about 1.5 mL. This internal volume is associated with an internal diameter of the syringe which affects the extrusion force needed to inject high viscosity dermal filler compositions. The internal diameters are generally about 4 mm to about 9 mm, more preferably from about 4.5 mm to about 6.5 mm. Further, the extrusion force needed to deliver the glass microsphere compositions from the syringe is dependent on the needle gauge. The gauges of needles used generally for medical purposes include gauges between about 16 G and about 31 G, more preferably about 21 G to about 27 G. A person of ordinary skill in the art can determine the correct syringe dimensions and needle gauge required to arrive at a particular extrusion force requirement.

The extrusion forces displayed by the glass microsphere composites described herein using the needle dimensions described above are applied using injection speeds that are comfortable to a patient. Comfortable to a patient is used to define a rate of injection that does not injure or cause excess pain to a patient upon injection to the soft tissue. One skilled in the art will appreciate that comfortable as used herein includes not only patient comfort, but also comfort and ability of the physician or medical technician injecting the glass microsphere composites. Although certain extrusion forces may be achievable with any injectable filler (including the glass microsphere composites), one skilled in the art understands that high extrusion forces can lead to lack of control during injection and that such lack of control may result in additional pain to the patient. The extrusion force can be fine-tuned by varying the amounts, types, and sizes of the microsphere component and/or the biocompatible matrix component of the composite, depending on the desired application. Extrusion forces of the present glass microsphere compositions can be from about 0.5 N to about 50 N, or more preferably from about 0.5 N to about 2 N, or about 1 N to about 7 N, or about 20 to about 30 N.

While several of the short-lived injectable fillers have favorable flow characteristics (e.g., are easy for the surgeon to inject), current formulations of longer-lasting implants, particularly those containing calcium hydroxyapatite, are inherently difficult to inject. The commercial formulation of calcium hydroxyapatite has lower viscosity at high temperature compared to room temperature or body temperature. Therefore in usual practice by most surgeons, the product is heated significantly above body temperature to allow smooth enough flow for injection, although the target tissue effects (at the site of implantation) of this have not been determined. The glass microsphere composites display certain nano-like alterations in physical properties, and behave much more like a liquid than a particulate material. Thus, the injection of the glass microsphere composites through a syringe is significantly easier than existing products.

The syringes and components are generally sterilized prior to use or sale. Sterilization includes any method known in the art to effectively kill or eliminate transmissible agents, preferably without substantially altering or degrading the glass microsphere compositions and any active agents.

One preferable method of sterilization of the filled syringes is by autoclave. Autoclaving can be accomplished by applying a mixture of heat, pressure and moisture to a sample in need of sterilization. Many different sterilization temperatures, pressures and cycle times can be used for this step. For example, the filled syringes may be sterilized at a temperature of at least about 120° C. to about 130° C. or greater. Moisture may or may not be utilized. The pressure applied is in some embodiments depending on the temperature used in the sterilization process. The sterilization cycle may be at least about 1 minute to about 20 minutes or more.

Sterilization also includes the use of an irradiation source which is known in the art to kill or eliminate transmissible agents. A beam of irradiation is targeted at the syringe containing the glass microsphere composite, and the wavelength of energy kills or renders the unwanted transmissible agents non-viable. Preferable energy useful include, but is not limited to ultraviolet light, gamma irradiation, visible light, microwaves, or any other wavelength or band of wavelengths which kills or eliminates the unwanted transmissible agents, preferably without substantially altering of degrading the carrier gel, gating agent, or any active agent payload. Many types of glasses have been shown to exhibit excellent radiation resistance in a variety of conditions and uses.

It is expected that during the life of a patent maturing from this application many relevant examples of microspheres will be developed and the scope of the term microsphere is intended to include all such new technologies a priori.

The terms "comprises", "comprising", "includes", "including", "having" and their conjugates mean "including but not limited to".

The term "consisting of" means "including and limited to".

The tell "consisting essentially of" means that the composition, method or structure may include additional ingredients, steps and/or parts, but only if the additional ingredients, steps and/or parts do not materially alter the basic and novel characteristics of the claimed composition, method or structure.

The term "plurality" means "two or more".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A glass microsphere, comprising:
   a main body free of any blowing agent, wherein the main body is solid while including a network of inter-connected pores produced by a phase separation process via thermal and chemical leaching operations, and extending throughout a cross-section of the solid glass microsphere.

2. The glass microsphere according to claim 1, wherein the network of pores traverse through the main body from one side to an opposite side.

3. The glass microsphere according to claim 1, further comprising at least one cargo within the network of pores.

4. The glass microsphere according to claim 1, wherein the main body has a diameter of 1-1,000 microns.

5. The glass microsphere according to claim 1, further comprising at least one surface coating.

6. A composition of matter, comprising:
   a plurality of microspheres, including at least one glass microsphere comprising a main body free of any blowing agent, wherein the main body is solid while including a network of inter-connected pores extending throughout a cross-section of the solid glass microsphere.

7. The composition of matter according to claim 6, further comprising a matrix medium.

8. A method of making the glass microsphere according to claim 1, comprising:
   melting a glass borosilicate frit to make a glass microsphere including a glass matrix;
   thermally treating the glass microsphere, separating the alkali-borate and silica phases in the glass matrix;
   leaching out preferentially the alkali-borate phase, forming a main body free of any blowing agent, wherein the main body is solid while including a network of inter-connected pores produced by the phase separation processes of the thermal and chemical leaching operations, the network of inter-connected pores extending throughout a cross-section of the solid glass microsphere, and,
   loading the microsphere with at least one cargo of interest, retaining the at least one cargo, coating the loaded microsphere as desired, and finally, releasing the at least one cargo of interest on demand, as desired.

* * * * *